United States Patent Office 3,197,441
Patented July 27, 1965

3,197,441
POLYMERIC REACTION PRODUCTS OF CAPRO-
LACTAM AND AMINO ALCOHOLS
Herbert L. Wehrmeister, Terre Haute, Ind., assignor to
Commercial Solvents Corporation, New York, N.Y., a
corporation of Maryland
No Drawing. Filed May 23, 1960, Ser. No. 30,784
12 Claims. (Cl. 260—78)

My invention relates to new and useful polymeric compositions and a process for preparing same; and more particularly, my invention relates to new and useful polymers which are the reaction products of epsilon-caprolactam and an amino alcohol having the following general formula:

wherein R is hydroxymethyl and $R_1$ is either hydroxyalkyl, alkyl or hydrogen.

I have now discovered new polymers which adhere especially strongly to glass, steel, iron and other materials which are useful in laminating layers of glass products such as glass cloth. One suitable method of utilizing the polymers of my invention in laminating layers of glass cloth consists of uniformly applying the polymer in the form of a melt to a glass cloth surface and, before solidification of the polymer occurs, applying a second glass cloth to the polymer treated surface. This process can be continued to produce a product of any desired thickness or having any desired number of layers.

The new polymers of my invention can be prepared by interaction of caprolactam and an amino alcohol having the following general formula:

wherein R is hydroxymethyl and $R_1$ is either hydroxyalkyl, alkyl, or hydrogen in molar ratios of from about 200 to 10 of the caprolactam to 1 of the amino alcohol at temperatures above 170° C. but below temperatures at which substantial decomposition of the polymeric reaction product and the reactants take place. I prefer, in preparing the polymers of any invention to first thoroughly mix caprolactam and amino alcohol in molar ratios of from about 200 to 10 of the caprolactam to one of the amino alcohol at temperatures ranging from about 70° C. to 120° C. to obtain a uniform mixture. I then heat the mixture at temperatures above 170° C. but below the temperature at which substantial decomposition of the polymeric reaction product and the reactants take place. After the reaction is completed I allow the reaction product to cool and upon cooling, I remove it from the reaction vessel.

Ordinarily at temperatures below 200° C. the reaction proceeds rather slowly while temperatures in excess of 250° C. give some decomposition of reactants. Generally, temperatures ranging from about 225° to 240° are preferred.

Ordinarily atmospheric pressure is generally utilized in my process. However, reduced pressures, even below 200 mm. can also be used.

Included among the amino alcohols which are operative in my invention are tris(hydroxymethyl)aminomethane, 2-amino-2- methyl-1,3-propanediol, 2-amino-2-ethyl-1,3-propanediol, 2-amino-1,3-propanediol, etc., and the like.

Small amounts of polymerization initiators, useful in polymerizing caprolactam can be added to the amino alcohols utilized in my invention to aid polymerization. Examples of such polymerization initiators include amino caproic acid, water etc., and the like.

The molar ratios of the reactants are critical in producing a product strongly adhesive to glass. Glass adhesion is observed when molar ratios as high as 200 of caprolactam to 1 of amino alcohol are employed. Glass adhesion is also observed when molar ratios as low as 10 of caprolactam to 1 of amino alcohol are employed. Products having maximum adherence to glass, however, are prepared using molar ratios of caprolactam to amino alcohol of from about 50 to 1 to about 25 to 1 respectively.

The polymers of my invention are hard solid materials. They are soluble in formic acid, phenol and m-cresol but are insoluble in water and in ethyl alcohol.

The following specific examples are offered to illustrate my invention and it is not intended that my invention be limited to the specific amounts, proportions, and procedures set forth therein.

Example I

In a 100 cc. glass Carius tube were mixed 70 grams of caprolactam produced by the Beckmann rearrangement of cyclohexanone oxime and 2.2 grams of tris(hydroxymethy)aminomethane at temperature of about 80° C. This mixture was then placed in a Carius furnace preheated to a temperature of between 225° C. and 240° C. and left for a period of 16 hours at this temperature. At the end of the 16-hour period, the product was removed from the furnace and allowed to cool to room temperature. Upon cooling to approximately 50° C. the Carius tube began to shatter, and shattering continued until the temperature of the product reached room temperature. Separation of the shattered glass from the product was extremely difficult due to the strong adhesive properties of the product. After water extraction, a molecular weight of 5,350 was determined for the product.

Example II

Essentially the same procedure was followed as described under Example I with the exception that 0.7 gram of tris(hydroxymethyl)aminomethane was used. Upon cooling to approximately 50° C. the Carius tube began to shatter, and shattering continued until the temperature of the product reached room temperature. Separation of the shattered glass from the product was extremely difficult due to the strong adhesive properties of the product. After water extraction, a molecular weight of 10,300 was determined for the product.

Example III

Essentially the same procedure was followed as described under Example I with the exception that 3.6 grams of tris(hydroxymethyl)aminomethane were used. Upon cooling to approximately 50° C. the Carius tube began to shatter, and shattering continued until the temperature of the product reached room temperature. Separation of the shattered glass from the product was extremely difficult due to the strong adhesive properties of the product. After water extraction, a molecular weight of 4,000 was determined for the product.

Example IV

Essentially the same procedure was followed as described under Example I with the exception that 373 grams of caprolactam and 10.5 grams of 2-amino-2-methyl-1,3-propanediol were used. Upon cooling to approximately 50° C. the Carius tube began to shatter and shattering continued until the temperature of the product reached room temperature. Separation of the shattered glass from the product was extremely difficult due to the strong adhesive properties of the product. After water extraction, a molecular weight of 5,125 was determined for the product.

This application is a continuation-in-part of my U.S. patent application Serial No. 859,838, filed December 16, 1959, now abandoned.

Now having described my invention, what I claim is:

1. A process for the preparation of hard soil polymers which consists of interacting caprolactam with an amino alcohol having the following general formula:

wherein R is hydroxymethyl and $R_1$ is a member selected from the group consisting of hydroxyalkyl, alkyl and hydrogen in molar ratios of the caprolactam to the amino alcohol of from about 200 to 1 to about 10 to 1 and at temperatures above 170° C. but below temperatures causing any substantial decomposition of the reaction product and the reactants.

2. The process of claim 1 wherein the temperature ranges from about 200° C. to about 250° C. and the molar ratio of caprolactam to amino alcohol is from about 50 to 1 to about 25 to 1.

3. The process of claim 1 wherein the temperatures range from 225° C. to about 240° C.

4. The process of claim 1 wherein the amino alcohol is tris(hydroxymethyl)aminomethane.

5. The process of claim 1 wherein the amino alcohol is 2-amino-2-methyl-1,3-propane diol.

6. The process of claim 1 wherein the amino alcohol is 2-amino-2-ethyl-1,3-propane diol.

7. The process of claim 1 wherein the amino alcohol is 2-amino-1,3-propanediol.

8. As new compositions of matter, hard solid polymeric products obtained by a process which consists of interacting caprolactam with an amino alcohol having the following general formula:

wherein R is hydroxymethyl and $R_1$ is a member selected from the group consisting of hydroxyalkyl, alkyl and hydrogen in molar ratios of the caprolactam to the amino alcohol of from about 200 to 1 to about 10 to 1 and at temperatures above 170° C. but below temperatures causing any substantial decomposition of the polymeric product and the reactants.

9. As new compositions of matter, hard solid polymeric products obtained by a process which consists of interacting caprolactam with tris(hydroxymethyl)aminomethane in molar ratios of the caprolactam to tris(hydroxymethyl)aminomethane of from about 200 to 1 to about 10 to 1 and at temperatures above 170° C. but below temperatures causing any substantial decomposition of the polymeric product and the reactants.

10. As new compositions of matter, hard solid polymeric products obtained by a process which consists of interacting caprolactam with 2-amino-2-methyl-1,3-propanediol in molar ratios of the caprolactam to the 2-amino-2-methyl-1,3-propanediol of from about 200 to 1 to about 10 to 1 and at temperatures above 170° C. but below temperatures causing any substantial decomposition of the polymeric product and the reactants.

11. As new compositions of matter, hard solid polymeric products obtained by a process which consists of interacting caprolactam with 2-amino-2-ethyl-1,3-propanediol in molar ratios of the caprolactam to the 2-amino-2-ethyl-1,3-propanediol of from about 200 to 1 to about 10 to 1 and at temperatures above 170° C. but below temperatures causing any substantial decomposition of the polymeric product and the reactants.

12. As new compositions of matter, hard solid polymeric products obtained by a process which consists of interacting caprolactam with 2-amino-1,3-propanediol in molar ratios of the caprolactam to the 2-amino-1,3-propanediol of from about 200 to 1 to about 10 to 1 and at temperatures above 170° C. but below temperatures causing any substantial decomposition of the polymeric product and the reactants.

References Cited by the Examiner

UNITED STATES PATENTS

| 2,456,271 | 12/48 | Graham | 260—785 |
| 2,526,078 | 10/50 | Kropa et al. | 260—78 |
| 2,686,732 | 8/54 | Montgomery et al. | 117—4 |

HAROLD N. BURSTEIN, *Primary Examiner.*

WILLIAM H. SHORT, *Examiners.*